United States Patent
Becker

(10) Patent No.: US 10,488,501 B2
(45) Date of Patent: Nov. 26, 2019

(54) DEVICE AND METHOD FOR CALIBRATING A LIGHT PROPAGATION TIME CAMERA

(71) Applicant: PMDTECHNOLOGIES AG, Siegen (DE)

(72) Inventor: Stefan Becker, Bergisch Gladbach (DE)

(73) Assignee: PMDTECHNOLOGIES AG, Siegen (DE)

(*) Notice: Subject to any disclaimer, the term of this patent is extended or adjusted under 35 U.S.C. 154(b) by 0 days.

(21) Appl. No.: 16/080,550

(22) PCT Filed: Feb. 27, 2017

(86) PCT No.: PCT/EP2017/054461
§ 371 (c)(1),
(2) Date: Aug. 28, 2018

(87) PCT Pub. No.: WO2017/157643
PCT Pub. Date: Sep. 21, 2017

(65) Prior Publication Data
US 2019/0072654 A1    Mar. 7, 2019

(30) Foreign Application Priority Data

Mar. 14, 2016 (DE) .................. 10 2016 204 140

(51) Int. Cl.
*G01C 3/08*     (2006.01)
*G01S 7/497*   (2006.01)
(Continued)

(52) U.S. Cl.
CPC ............ *G01S 7/497* (2013.01); *G01S 7/4813* (2013.01); *G01S 17/36* (2013.01); *G01S 17/89* (2013.01)

(58) Field of Classification Search
CPC .......... G01S 7/4808; G01S 17/08; G01C 3/08
(Continued)

(56) References Cited

U.S. PATENT DOCUMENTS

2004/0036891 A1* 2/2004 Lou ................... G01B 11/2504
                                                                        356/602
2015/0302570 A1   10/2015 Shirakyan et al.
2016/0334508 A1* 11/2016 Hall .................... G01S 7/4811

FOREIGN PATENT DOCUMENTS

DE             19704496 A1      3/1998

OTHER PUBLICATIONS

Schiller, I. et al.: "Calibration of a PMD-camera using planar calibration pattern together with a multi-camera setup", Apr. 28, 2008 (Apr. 28, 2008), XP055032500, Retrieved from the Internet: <URL:http://www.mip.informatik.uni-kiel.de/tiki-download_file.php?fileId=943> [retrieved on Jul. 12, 2012].

(Continued)

*Primary Examiner* — Mark Hellner
(74) *Attorney, Agent, or Firm* — Harness, Dickey & Pierce, P.L.C.

(57) ABSTRACT

The disclosure relates to a method for calibrating and/or evaluating a light propagation time camera by means of a reference surface, wherein the light propagation time camera has a light propagation time sensor consisting of an array of light propagation time pixels, in which method various spacings between the light propagation time camera and the reference surface are set in order to calibrate and/or evaluate the light propagation time camera by means of translational spacing changes. The method has the following steps: determining first distance data for a first spacing, determining second distance data for a second spacing, calculating distance differences from the first and second distance data, determining an orientation of the light propagation time camera with respect to the reference surface on the basis of the calculated distance differences.

8 Claims, 2 Drawing Sheets

(51) Int. Cl.
*G01S 17/89* (2006.01)
*G01S 17/36* (2006.01)
*G01S 7/481* (2006.01)

(58) Field of Classification Search
USPC ...................................................... 356/4.01
See application file for complete search history.

(56) References Cited

OTHER PUBLICATIONS

Chiabrando, F. et al.: "Sensors for 3D Imaging: Metric Evaluation and Calibration of a CCD/CMOS Time-of-Flight Camera", Sensors, vol. 9, No. 12, Dec. 11, 2009, (Dec. 11, 2009), pp. 10080-10096, XP055372288, DOI: 10.3390/s91210080.
Lindner, M. et al.: "Lateral and Depth Calibration of PMD-Distance Sensors", Jan. 1, 2006 (Jan. 1, 2006), Advances in Visual Computing Lecture Notes in Computer Science; LNCS, Springer, Berlin, DE, pp. 524-533, XP019050872, ISBN: 978-3-540-48626-8.

* cited by examiner

DEVICE AND METHOD FOR CALIBRATING A LIGHT PROPAGATION TIME CAMERA

CROSS-REFERENCE TO RELATED APPLICATIONS

This application is a National Stage of International Application No. PCT/EP2017/054461, filed on Feb. 27, 2017, and published in German as WO2017/157643 A1 on Sep. 21, 2017. This application claims the priority to German Patent Application No. 10 2016 204 140.1, filed on Mar. 14, 2016. The entire disclosures of the above applications are incorporated herein by reference.

FIELD

The disclosure relates to a device and a method for calibrating a light propagation time camera or a light propagation time camera system according to the type specified in the independent claims.

BACKGROUND

This section provides background information related to the present disclosure which is not necessarily prior art.

The term light propagation time camera or light propagation time camera system should include in particular all light propagation time or 3D TOF camera systems that obtain propagation time information from the phase shift of emitted and received radiation. As light propagation time or 3D TOF cameras in particular PMD cameras with photomix detectors (PMD) are suited, as described inter alia in DE 197 04 496 A1 and available, for example, from 'ifm electronic GmbH' or 'PMD-Technologies GmbH' as O3D camera or CamCube. In particular, the PMD camera allows a particular flexible arrangement of the light source and the detector, which can be arranged both within a housing or separately.

SUMMARY

This section provides a general summary of the disclosure, and is not a comprehensive disclosure of its full scope or all of its features.

It is the object of the disclosure to improve the accuracy of the distance measurement of a light propagation time camera system.

This object is achieved by the device according to the disclosure and the method according to the disclosure in compliance with the independent claims.

Advantageously a method for calibrating and/or evaluating a light propagation time camera with the aid of a reference surface is provided, wherein the light propagation time camera comprises a light propagation time sensor consisting of an array of light propagation time pixels, in which for calibrating and/or evaluating of the light propagation time camera by changes of the translational distance different distances between the light propagation time camera and the reference surface are set, comprising the steps:
  determining first distance data for a first distance,
  determining second distance data for a second distance,
  calculating distance differences from the first and the second distance data,
  determining an orientation of the light propagation time camera (1, 20) with respect to the reference surface (45) based on the calculated distance differences.

The advantage of this procedure is that the light propagation time camera does not need to be aligned with high precision with respect to the reference surface for calibration.

It is also intended to calculate a reference point on the light propagation time sensor, at the position of which the distance differences have a minimum, based on the distance differences.

Starting from the position of the determined reference point and/or a pixel area arranged around the reference point, an orientation of the light propagation time sensor (22) or the light propagation time camera (1, 20) with respect to the reference surface (45) is determined, and the light propagation time camera (I, 20) is calibrated and/or evaluated on the basis of the determined orientation of the light propagation time sensor (22).

It is particularly advantageous if a "fixed pattern phase noise" (FPPN) is determined on the basis of the detected distance data and the determined orientation.

Another advantage is a device for carrying out one of the aforementioned methods.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the following, the disclosure is explained in more detail based on exemplary embodiments with reference to the drawings.

In the drawings:

FIG. 1 schematically shows a light propagation time camera system;

Corresponding reference numerals indicate corresponding parts throughout the several views of the drawings.

DETAILED DESCRIPTION

In the following description of the preferred embodiments the same reference symbols designate the same or comparable components.

Figure 1:
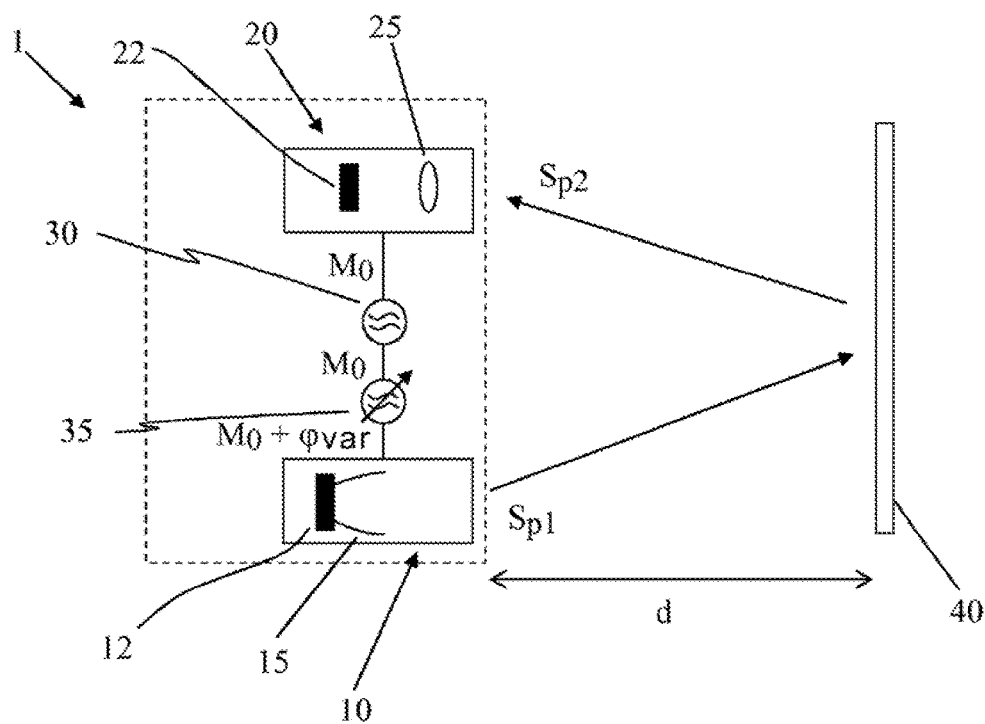

FIG. 1 shows a measurement situation for an optical distance measurement by use of a light propagation time camera, as known, for example, from DE 197 04 496 A1.

The light propagation time camera system 1 comprises an emitting unit or a lighting module 10 with an illumination 12 and an associated beam shaping optics 15 as well as a receiving unit or a light propagation time camera 20 including a receiving optics 25 and a light propagation time sensor 22.

The light propagation time sensor 22 comprises at least one propagation time pixel, preferably a pixel array, and is configured in particular as a PMD sensor. The receiving optics 25 typically consists of several optical elements to improve the imaging properties. The beam shaping optics 15 of the emitting unit 10 can be formed, for example, as reflector or lens optics. In a very simple configuration optical elements both on the receiving and the emitting side can be dispensed with, if necessary.

The measuring principle of this arrangement is essentially based on the fact that the propagation time and thus the distance travelled by the received light can be determined based on the phase shift of the emitted and the received light. For this purpose, a specific modulation signal $M_0$ with a basic phasing ($\varphi_0$) is applied simultaneously to the light source 12 and the light propagation time sensor 22 via a modulator 30. In the example shown, moreover, a phase shifter 35 is provided between the modulator 30 and the light source 12, by means of which the basic phasing ($\varphi_0$) of the modulation signal $M_0$ of the light source 12 can be shifted by defined phasings $\varphi_{ear}$. For typical phase measurements, preferably phasings of $\varphi_{var}=0°, 90°, 180°, 270°$ are used.

According to the set modulation signal the light source 12 emits an intensity modulated signal $S_{p1}$ with the first phasing p1 or p1=($\varphi_0+\varphi_{var}$). In the case shown, this signal $S_{p1}$ or the electromagnetic radiation is reflected by an object 40 and is incident on the light propagation time sensor 22 as a reception signal $S_{p2}$ with a second phasing p2=$\varphi_0+\varphi_{var}+\Delta\varphi$ ($t_L$) with a corresponding phase shift due to the travelled distance. The modulation signal $M_0$ is mixed with the received signal $S_{p2}$ in the light propagation time sensor 22, wherein the phase shift or the object distance d is determined from the resulting signal.

Infrared light-emitting diodes are preferably suitable as illumination source or light source 12. Of course, other radiation sources in other frequency ranges are also conceivable, in particular light sources in the visible frequency range come into consideration.

Figure 2:
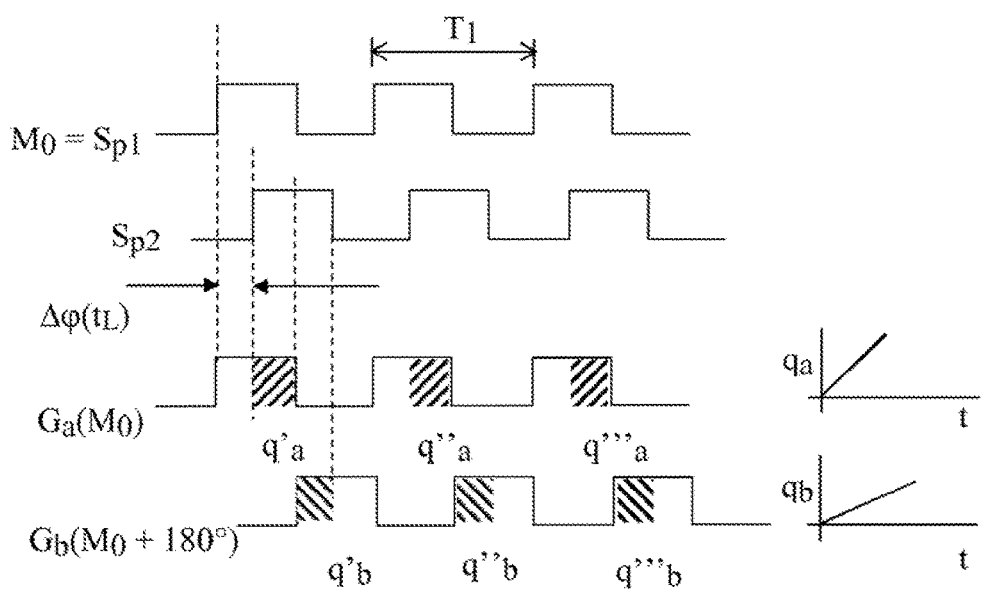
FIG. 2 shows a modulated integration of generated charge carriers.

The basic principle of phase measurement is shown schematically in FIG. 2. The upper curve shows the time curve of the modulation signal $M_0$ with which the illumination 12 and the light propagation time sensor 22 are driven. The light reflected from the object 40 according to its propagation time $t_L$ is incident on the light propagation time sensor 22 with a phase shift $\Delta\varphi(t_L)$ as a reception signal $S_{p2}$. The light propagation time sensor 22 accumulates the photonically generated charges q over several modulation periods in the phasing of the modulation signal $M_0$ in a first accumulation gate Ga and in a phasing $M_0+180°$ phase shifted by 180° in a second accumulation gate Gb. From the ratio of the charges qa, qb accumulated in the first and the second gate Ga, Gb, the phase shift $\Delta\varphi(t_L)$ and thus an object distance d can be determined.

For characterizing 2D camera systems usually such a camera and/or a target are arranged on a linear displacement unit and shifted relative to each other. Usually it is intended to illuminate the target, for example a suitable test chart, well and to shift the camera relative to the target. This avoids the need for shifting the target illumination as well.

In principle, a comparable arrangement can also be used for evaluating and/or calibrating a distance sensor. For the measurement of 3D cameras, preferably a linear displacement unit is used, which is aligned normally, i.e. perpendicularly, to a planar reference surface of known reflectivity in a nearly flare-free environment. Nearly flare-free means here that the material or the colour of the measurement setup is non-reflective in the relevant light spectrum, usually near infrared. The 3D camera to be measured is arranged on the displacement unit and by shifting the displacement unit together with the camera, data (raw data) of the camera are recorded at different distances and evaluated.

For a precise evaluation of residual errors in the distance measurement and/or for the calibration of systematic measurement errors, known for example as so-called "wiggling", it is necessary to measure precise reference values. With use of the abovementioned displacement unit or measuring rail this normally means a precise mechanical alignment of the camera with respect to the reference surface/target. The prerequisite is that the displacement unit is oriented precisely perpendicular to a planar reference surface or the target. This mechanical alignment is complex and prone to errors.

The basic idea of the disclosure is to reduce the effort for the calibration/evaluation of a camera.

The disclosure is based on the following considerations: If a light propagation time camera is moved by a certain distance, e.g. 1000 mm, it should be possible to determine exactly this difference from the distance data of the camera. However, this basically only applies to the pixel whose viewing angle is aligned normally to the reference surface through the camera lens.

Such a pixel with an orthogonal viewing angle onto the reference surface is characterized in that it has the smallest distance to the reference surface. Since each pixel has an individual offset ('fixed pattern phase noise' (FPPN)), it is initially not possible to determine the pixel with the smallest distance to the reference surface by direct measurement without calibration.

According to the disclosure, it is proposed that the difference values of two (or more) measurements are evaluated at different distances. In such a differential image, the FPPN is no longer present. The given precision in the alignment of the displacement unit with respect to the reference surface ensures that the minimum value in the difference image defines the pixel position that views orthogonal onto the reference area. This pixel position can be used to evaluate the systematic measurement errors, such as wiggling, at any distance set by the displacement unit.

The method described above explicitly does not require any particular precision in the mounting of the camera and is therefore very robust and provides a very high data quality.

The method described above also allows to improve the calibration of the FPPN of a light propagation time sensor with the aid of a lens calibration of the camera objective. By means of a lens calibration then the actual distances of the individual image pixels to their respective target point on the reference surface can be determined.

The FPPN is obtained as the difference between the actual and the measured distance. An alignment error during a conventional calibration thus leads to errors in the FPPN calibration.

However, the pixel position in the image, which is aligned orthogonally to the surface, has already been precisely determined by the method according to the disclosure. By use of the data from the lens calibration, any possible existing rotation or orientation of the camera with respect to the reference surface can be determined and in turn the actual distances for the FPPN determination can be corrected accordingly.

The method according to the disclosure is applicable identically, if instead of the camera the reference surface is mounted on a linear displacement unit.

This method enables a very high precision of calibration data such as wiggling and FPPN without the need for a precise, complex mechanical alignment of a single camera. It is only utilized that the linear displacement unit is precisely aligned with respect to the planar measuring surface.

Figure 3:
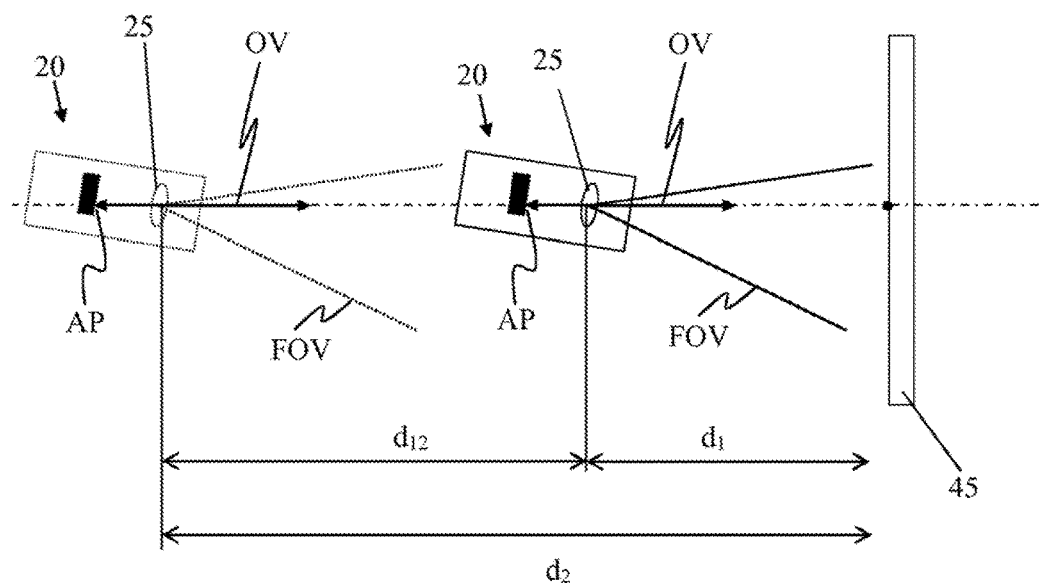
FIG. 3 shows a calibration device according to the disclosure.

FIG. 3 schematically shows the procedure according to the disclosure. In the example shown, the light propagation time camera 20 is not arranged plane-parallel to the object or the reference surface 45. In the area of the field of view (FOV), however, there exists an orthogonal view vector OV that is aligned parallel to the normal of the reference surface. This orthogonal view vector OV corresponds to a reference point on the light propagation time sensor. With a purely translational movement of the camera 20, the parallel alignment of the orthogonal view vector OV to the normal of the reference surface 45 is maintained and the position of the reference point AP on the light propagation time sensor does not change either. The reference point basically has the minimum (optical) distance to the reference surface.

According to the disclosure it is intended for a calibration to determine distance data and differences for at least two distances $d_1$, $d_2$ (ij designates the pixel ij in the sensor array)

$$d_{12ij}=(d_{2ij}+FPPN)-(d_{ij}+FPPN)=d_{2ij}-d_{1ij}.$$

In a known way the fixed pattern noise is cancelled out by the subtraction. A depth image or, in this case, a differential depth image can then be determined over all pixels ij.

In order to determine the orientation of the light propagation time sensor 22 with respect to the reference surface 45, initially a point/reference point on the light propagation time sensor 22 is determined at which the distance difference $d_{12}$ or the differential depth image has a minimum.

In a possible embodiment the position of the pixel with the minimum distance difference is determined as the reference point.

However, it is particularly advantageously intended to extrapolate a reference point based on the pixel-specific distance differences. For example, the distance minimum could be determined in a highly scaled and smoothened differential depth image. The advantage of this procedure is that the position of the reference point can be determined more precisely, independent of the sensor resolution, and thus the orientation of the light propagation time sensor and, as a result, the FPPN correction can be calculated more precisely.

For the sake of simplicity, FIG. 3 shows only the light propagation time camera 20; in principle, the procedure according to the disclosure also works when the complete light propagation time camera system 1 including the camera 20 and the illumination 10 are moved together translationally.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for calibrating and/or evaluating a light propagation time camera with the aid of a reference surface, wherein the light propagation time camera comprises a light propagation time sensor consisting of an array of light propagation time pixels, in which different distances between the light propagation time camera and the reference surface are set by translational distance changes for calibrating and/or evaluating the light propagation time camera, including the steps:
determining first distance data for a first distance;
determining second distance data for a second distance;
calculating distance differences from the first and second distance data;
determining an orientation of the light propagation time camera with respect to the reference area based on the calculated distance differences,
wherein based on the distance differences a reference point (AP) on the light propagation time sensor is calculated, at the position of which the distance differences have a minimum.

2. The method according to claim 1, in which based on the position of the determined reference point (AP) and/or a pixel area around the reference point an orientation of the light propagation time sensor or the light propagation time camera with respect to the reference surface is determined.

3. The method according to claim 1, in which the light propagation time camera is calibrated and/or evaluated based on the detected distance data and the detected orientation of the light propagation time sensor.

4. The method according to claim 3, in which a 'fixed pattern phase noise' (FPPN) is determined based on the detected distance data and the determined orientation.

5. The device for calibrating a light propagation time camera or a light propagation time camera system which is adapted to perform a method according to claim 1, comprising:
a displacement unit for adjusting a distance between the light propagation time camera and a reference surface; and
an evaluation unit for calibrating the light propagation time camera, which is configured such that based on distance data which have been determined at different distances an orientation of the light propagation time camera with respect to the reference surface is determined.

6. A method for calibrating and/or evaluating a light propagation time camera with the aid of a reference surface, wherein the light propagation time camera comprises a light propagation time sensor consisting of an array of light propagation time pixels, in which different distances between the light propagation time camera and the reference surface are set by translational distance changes for calibrating and/or evaluating the light propagation time camera, including the steps:
determining first distance data for a first distance;
determining second distance data for a second distance;
calculating distance differences from the first and second distance data;
determining an orientation of the light propagation time camera with respect to the reference area based on the calculated distance differences,
wherein the light propagation time camera is calibrated and/or evaluated based on the detected distance data and the detected orientation of the light propagation time sensor,
wherein a 'fixed pattern phase noise' (FPPN) is determined based on the detected distance data and the determined orientation.

7. The method according to claim 6, in which based on the position of the determined reference point (AP) and/or a pixel area around the reference point an orientation of the light propagation time sensor or the light propagation time camera with respect to the reference surface is determined.

8. The device for calibrating a light propagation time camera or a light propagation time camera system which is adapted to perform a method according to claim 6, comprising:

a displacement unit for adjusting a distance between the light propagation time camera and a reference surface; and an evaluation unit for calibrating the light propagation time camera, which is configured such that based on distance data which have been determined at different distances an orientation of the light propagation time camera with respect to the reference surface is determined.

* * * * *